Patented July 29, 1924.

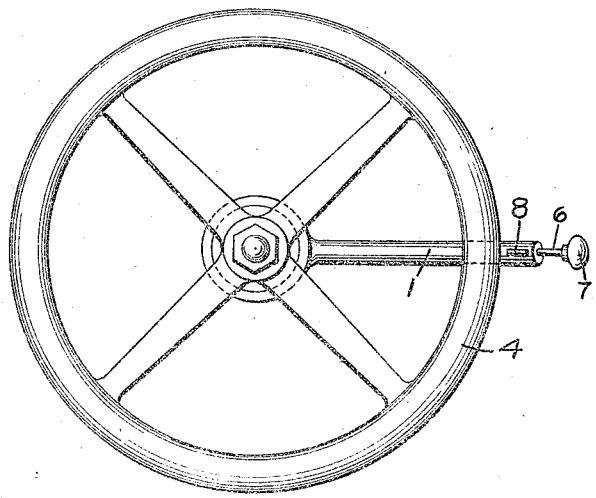
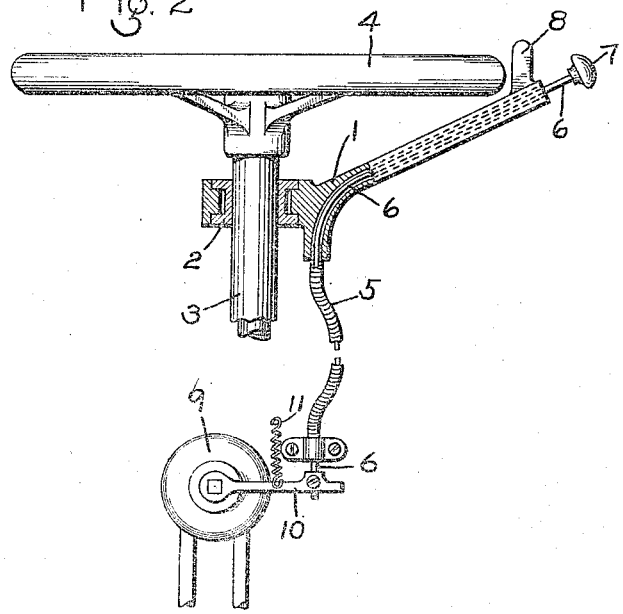

1,503,326

UNITED STATES PATENT OFFICE.

GEORGE S. LANE, OF SAN FRANCISCO, CALIFORNIA, ASSIGNOR TO THE WESTINGHOUSE AIR BRAKE COMPANY, OF WILMERDING, PENNSYLVANIA, A CORPORATION OF PENNSYLVANIA.

VEHICLE BRAKE CONTROL DEVICE.

Application filed July 8, 1921. Serial No. 483,357.

*To all whom it may concern:*

Be it known that I, GEORGE S. LANE, a citizen of the United States, residing at San Francisco, in the county of San Francisco and State of California, have invented new and useful Improvements in Vehicle Brake Control Devices, of which the following is a specification.

This invention relates to motor vehicle brakes and more particularly to a device for mechanically controlling the brakes.

The principal object of my invention is to provide a vehicle brake controlling device in which a push wire is employed for transmitting the manual force for operating a brake valve or other brake controlling device.

In the accompanying drawing; Fig. 1 is a plan view of a vehicle steering wheel, showing my invention associated therewith; and Fig. 2 an elevational view thereof.

As shown in the drawing, a hollow arm 1 may be rotatably mounted on a bearing member 2 secured to the steering column 3 near the steering wheel 4 and within the hollow arm is passed the push wire 6 of a section of the well known Bowden push wire cable. The push wire 6 is provided at its end, convenient and adjacent to the rim of the steering wheel 4, with a push button 7. Secured to the cable 5, near the steering wheel is a clip 8, which is adapted to be placed between two fingers, when the hand grasps the steering wheel, so that the hollow arm 1 moves with the hand to always maintain the push button 7 in position for ready operation by the fingers of the hand.

At a desired point on the vehicle, a brake controlling device, such as a brake valve device 9, is mounted, and the push wire 6 is operatively connected to the brake valve handle 10, so that by the movement of the push wire, the brake valve is operated for controlling the supply and release of fluid under pressure for controlling the vehicle brakes.

In operation, the clip 8 is caught between two fingers of the hand when the steering wheel is grasped, so that the hollow arm 1 is rotated with the hand and the steering wheel and when it is desired to apply the brakes, the push button 7 is depressed so as to cause the push wire 6 to operate the handle 10 of the brake valve device 9.

The brakes may be released by removing the hand from the push button and allowing the spring 11 to return the brake valve handle 10 to release position.

Having now described my invention, what I claim as new and desire to secure by Letters Patent, is:—

1. In a motor vehicle brake, the combination with a steering wheel and a device for controlling the brakes, of a hollow arm movable with the steering wheel, a push wire operatively connected to said device and extending through said arm, and manually operated means for actuating said push wire, said wire extending from said manually operated means to said device.

2. In a motor vehicle brake, the combination with a steering wheel and a device for controlling the brakes, of a continuous one piece push wire operatively connected to said device and means operable by the hand while grasping the steering wheel for actuating said push wire.

3. In a motor vehicle brake, the combination with a steering wheel and a device for controlling the brakes, of a push wire operatively connected to said device and means movable with the hand which grasps the steering wheel for actuating said push wire, said push wire extending from said means to said device.

4. In a motor vehicle brake, the combination with a steering wheel and a device for controlling the brakes, of a push wire operatively connected to said device, a clip associated with the push wire for moving same with the hand which grasps the steering wheel, and a push button for actuating said push wire.

5. In a motor vehicle brake, the combination with a steering wheel, of a brake valve device for controlling the brakes, a push wire operatively connected to said valve device, and a push button attached to one end of the push wire adjacent to the steering wheel.

In testimony whereof I have hereunto set my hand.

GEORGE S. LANE.